United States Patent [19]
Fappas, Jr. et al.

[11] Patent Number: 5,142,946
[45] Date of Patent: Sep. 1, 1992

[54] SHARPENER FOR CIRCULAR SAWS
[75] Inventors: John N. Fappas, Jr., Gresham; Ronald W. Harriman, Portland, both of Oreg.
[73] Assignee: Mobile Manufacturing Company, Troutdale, Oreg.
[21] Appl. No.: 793,203
[22] Filed: Nov. 18, 1991
[51] Int. Cl.[5] .............................................. B23D 63/14
[52] U.S. Cl. ......................................... 76/37; 51/247
[58] Field of Search ....................... 76/37, 40, 41, 78.1, 76/79.5; 51/246, 247

[56] References Cited
U.S. PATENT DOCUMENTS

| 1,456,402 | 5/1923 | Ramsey | 76/37 |
| 2,076,916 | 4/1937 | Perkins | 76/41 |
| 2,709,378 | 5/1955 | Risor | 76/37 |

FOREIGN PATENT DOCUMENTS 0683348 11/1939 Fed. Rep. of Germany .......... 76/37

*Primary Examiner*—Roscoe V. Parker
*Attorney, Agent, or Firm*—Eugene M. Eckelman

[57] ABSTRACT

A base member has a clamping surface and an arm extending from the base member at an angle. The arm is attached to the base member for pivotal movement and supports a power grinder for grinding a saw blade tooth by pivotal movement of the arm. The base member supports a clamp that releasably clamps the sharpener to a saw blade by engaging the blade between the clamping surface and the clamp. The base member has at least one projection adjacent the clamping surface that has insert engagement in at least one of the apertures in a saw tooth that are used for tool insert and removal of the tooth from the blade. A pair of the projections are provided for teeth that have two apertures. For teeth with one aperture only, a second projection on the base member is located on the base member for engaging a gullet portion of the tooth.

15 Claims, 3 Drawing Sheets

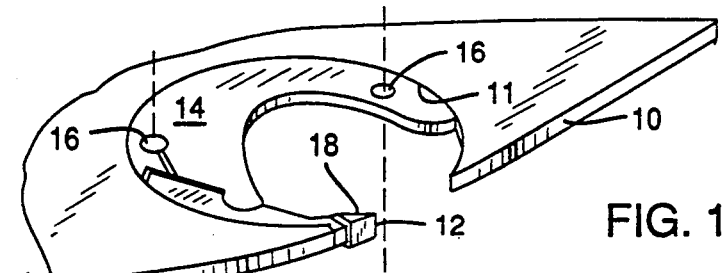
FIG. 1
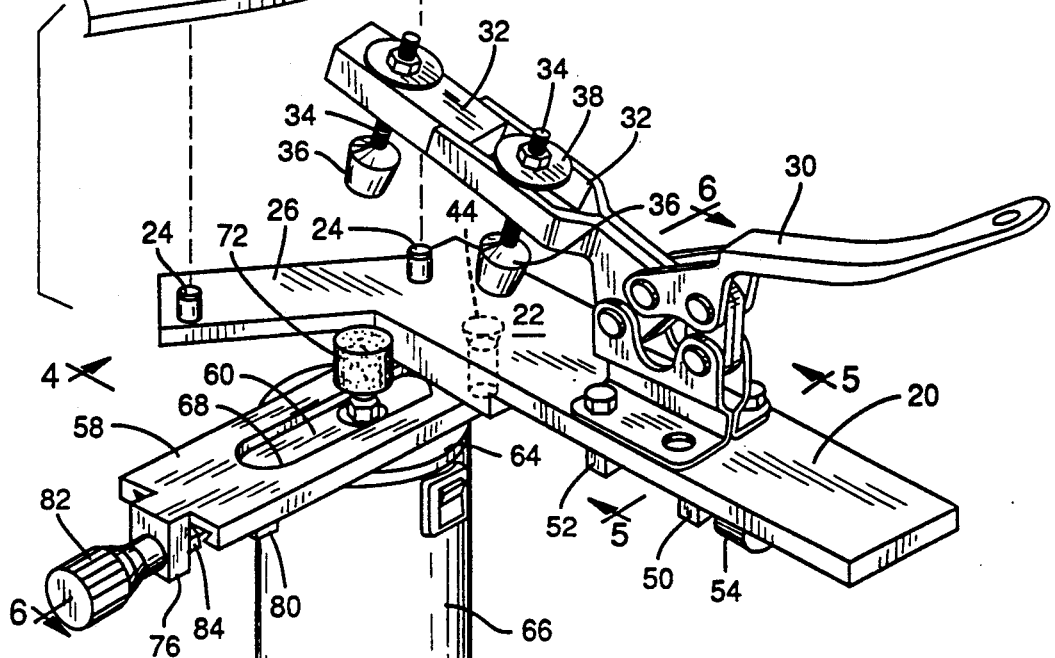
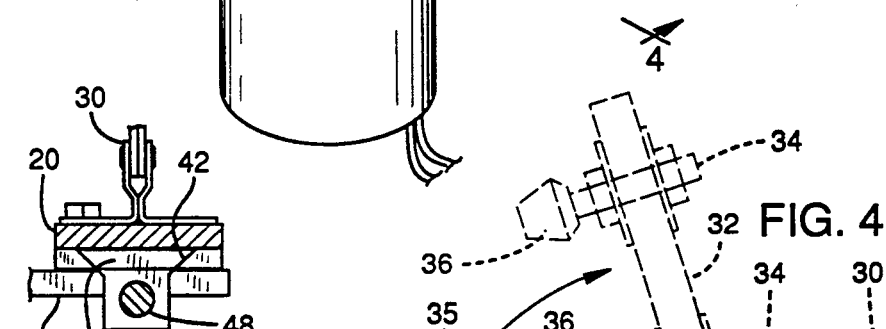
FIG. 5      FIG. 4
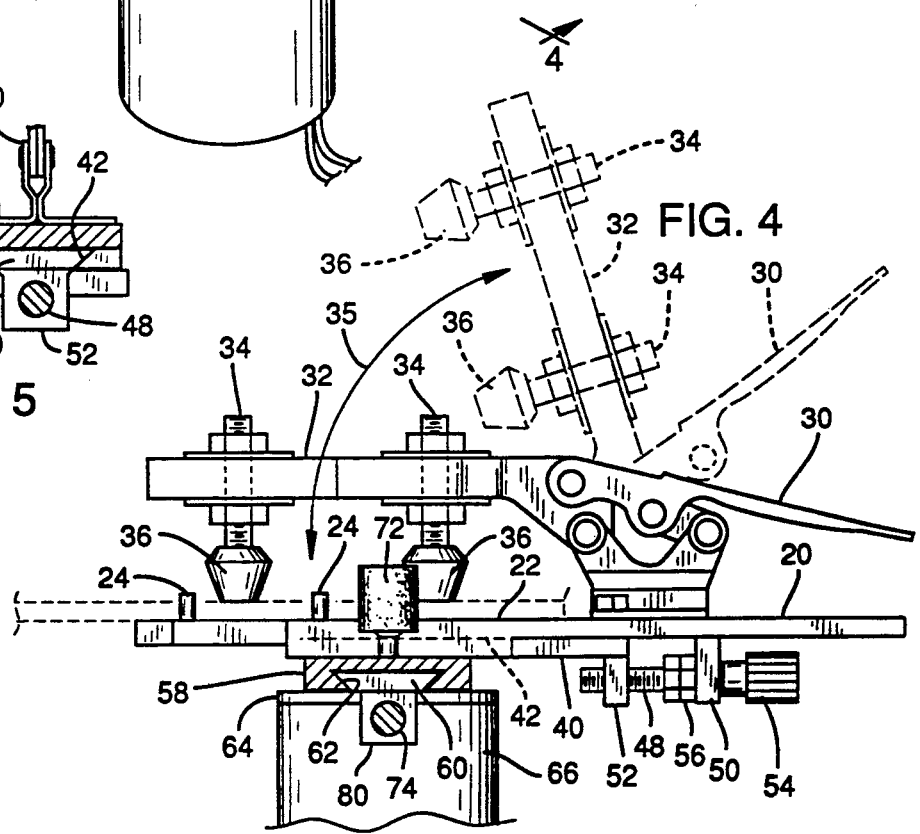

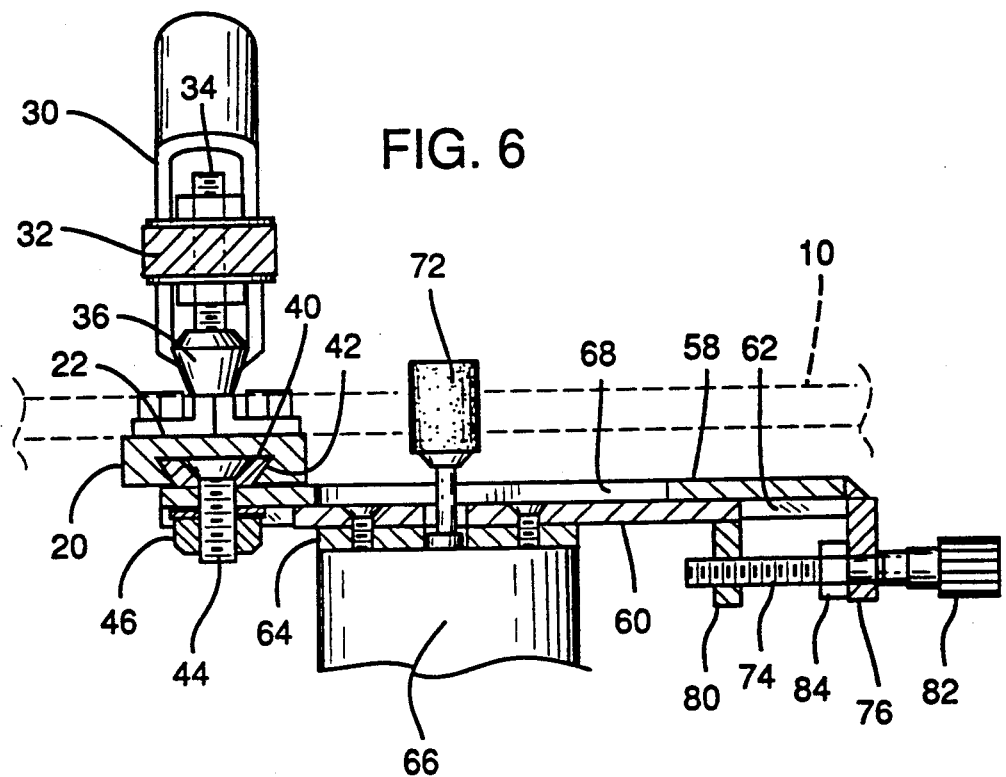

SHARPENER FOR CIRCULAR SAWS

BACKGROUND OF THE INVENTION

The larger type circular saws are provided with a series of recesses around their peripheries to receive teeth that are locked in place by retainers. The retainers have apertures for engagement by a suitable tool that operates the retainer for the insertion and removal of the teeth. Some of these retainers have a single aperture for receiving the tool and others have two apertures. A single aperture tooth is shown in Tower U.S. Pat. No. 2,651,219 and a double aperture tooth is shown in Bucknam U.S. Pat. No. 2,249,743.

These prior patents also illustrate devices that are used to sharpen circular saws and that are temporarily attached or mounted on the saw blade while sharpening is accomplished. The Tower patent includes a grinding motor mount that is positioned on the blade by engagement of a pin on the mount with an aperture in the retainer for the teeth.

SUMMARY OF THE INVENTION

According to the present invention and forming a primary objective thereof, a sharpener for circular saws is provided that amounts to an improvement over prior structures in its arrangement for holding the sharpener in a stable mounted position on the blade in a sharpening operation. More particularly, not only is the sharpener located for mounting on a saw blade by engagement with one or two apertures in the saw tooth retainer but also is clamped securely in place by engagement with opposite sides of the blade whereby to positively anchor the sharpener in place and eliminate inaccurate sharpening due to play that would otherwise result from loose tolerance fits with the apertures.

Another object of the invention is to provide a sharpener of the type described that is simplified in structure and operation.

Another object of the invention is to provide a sharpener that due to the general structure thereof can be made in a slightly modified form to be used with tooth retainers of a type that have a single mounting tool-receiving aperture therein.

In carrying out the objectives of the invention, the sharpener comprises a base member having a clamping surface portion and at least one projection on the base member adjacent the clamping surface portion that has insert engagement in at least one of the apertures in a saw tooth retainer. Arm means extend from the base member at an angle to said base member, and attaching means attach this arm to the base member for pivotal movement of the arm means relative to the base member. Powered grinding means are mounted in suspended relation on the arm means and are movable pivotally therewith in a grinding operation. Releasable clamp means are provided on the base member that releasably clamp the sharpener to a saw blade by engaging said blade between the clamping surface portion and the clamp means. The clamp means engages the saw blade at spaced points for establishing a positive stationary positioning of the blade on the base member. The sharpener includes adjusting means that adjust pivot support of the arm means on the base member to vary the angle of grind on a tooth and the grinding means is adjustable along the arm means to adjust for tooth and grinder wear.

The invention will be better understood and additional objects and advantages will become apparent from the following description taken in connection with the accompanying drawings.

BRIEF DESCRIPTION OF THE DRAWINGS

FIG. 1 is a perspective view of the present sharpener with the clamp means open and with a saw blade on which the sharpener is to be mounted being shown in a fragmentary exploded position, this view showing association of the sharpener with a tooth retainer having two apertures.

FIG. 4 is a sectional view taken on the line 4—4 of FIG. 1,

FIG. 5 is a sectional view taken on the line 5—5 of FIG. 1, and

FIG. 6 is a sectional view taken on the line 6—6 of FIG. 1.

DETAILED DESCRIPTION OF PREFERRED EMBODIMENTS

Figure 2:
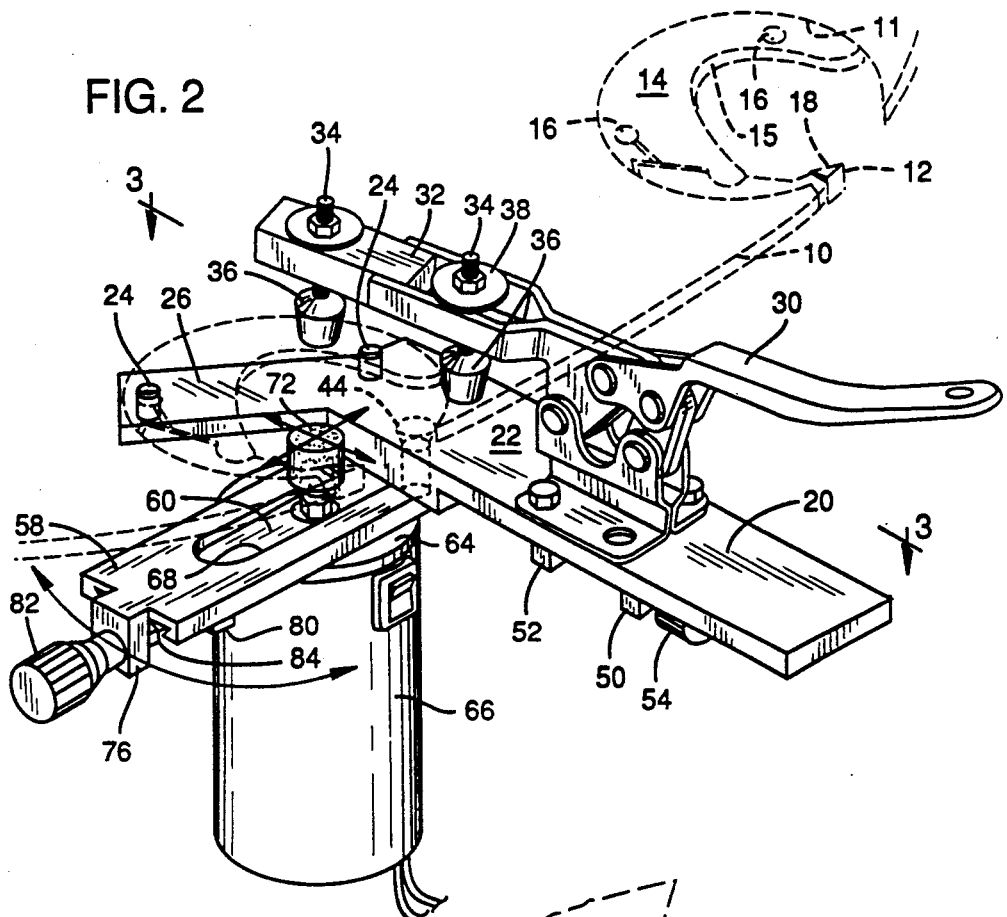
FIG. 2 is a view taken similar to FIG. 1 but showing the clamp means closed on a saw blade, the saw blade being shown in broken lines.

With particular reference to the drawings, a circular saw blade of the type to be sharpened by the present sharpener is designated by the numeral 10. Such a saw blade has a series of recesses 11 around its peripherary that receive teeth 12 locked removably in place by retainers 14 having a gullet portion 15. These retainers have one or more apertures 16 and are inserted and removed by a suitable tool, not shown, that engages the apertures 16. The teeth have an inwardly directed surface 18 on a tip thereof that is ground by sharpeners for renewing the cutting tips.

Figure 3:
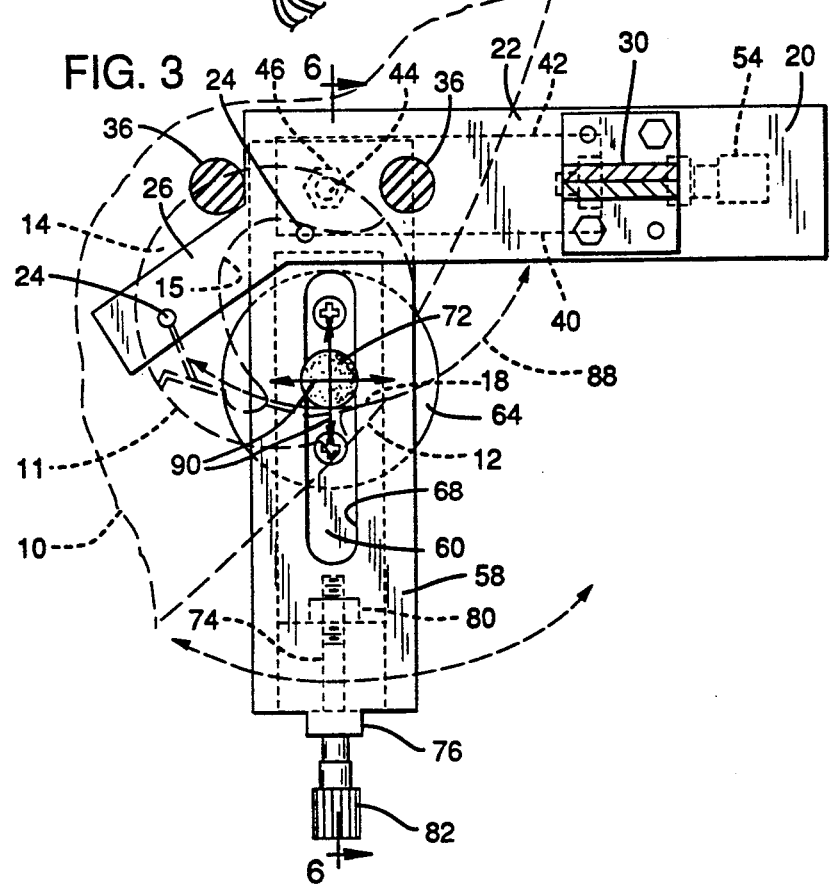
FIG. 3 is a sectional view taken on the line 3—3 of FIG. 2, this view showing a modification of the present sharpener for use with saw teeth retainers of the type having a single aperture.

The sharpener of the invention includes a base or arm 20 that is several inches long and has a flat top surface 22 at least in a forward portion thereof. This flat surface has one or more projecting pins 24 adjacent the front that are located selectively for fitting in apertures 16 in the tooth retainers 14 of a saw blade. Two of the pins 24 are shown in FIGS. 1, 2 and 4 for use on a saw blade having two of the apertures 16, whereas FIG. 3 shows a structural arrangement of the pins for a saw blade that has one aperture 16, as will be more fully described hereinafter. The forward end 26 of the base 20 is suitably shaped for matching the pins 24 to the apertures 16 as well as to angle the arm 20 away radially from the saw blade whereby to be spaced from the tooth to be sharpened and allow for the operation of grinding means to be described.

The arm 20 supports a clamp device 30 such as an overcenter, vice-grip type device that has a forwardly projecting arm 32 carrying two depending clamp extensions 34 with rubber or other resilient-type abutment shoes 36 arranged to engage a surface of a saw blade and a retainer 14. Clamp 30 is operable between open and closed positions as shown respectively in FIGS. 1 and 2 and as shown in such operation by arrow 35 in FIG. 4. The clamp extensions 34 are adjustable in length and for this purpose they may comprise screw posts threadedly mounted in the arm 32. By suitable adjustment of these posts, clamp 30 when closed is arranged to tightly engage a saw blade between the upper surface 22 thereof and the abutment shoes 36. Also, one of the clamp extensions is adjustable longitudinally of the arm 32, such as by opposing clamp washers 38 whereby to vary the spacing between the clamp shoes for best engagement with the saw blade and retainers 14.

Base 20 supports a slide member 40, FIGS. 4 and 6, on its undersurface in a V-type track 42, and this slide member integrally supports a depending pivot shaft 44, best seen in FIG. 6, with a bottom friction clamp nut 46 thereon. Slide member 40 is adjustable longitudinally of the base 20 by a threaded rod 48 supported for free rotation in a depending flange 50 integral with the base. This rod is threadedly engaged in a depending flange 52 integral with the slide member 40. The rearward end of threaded rod 48 terminates in a hand knob 54 which by selected manual rotation will drive the slide member 40 to a selected position for proper positioning of the pivot shaft 44, to be described. Lock nut means 56 are mounted on threaded rod 48 adjacent flange 50 for locking the pivot shaft in a selected position.

An elongated motor support plate 58 is clamped to the bottom of base 20 in flush engagement therewith by the clamp nut 46 on the pivot shaft 44. Although nut 46 holds the motor support plate 58 firmly against the bottom of base 20, the motor support plate can be manually forced to pivot on the shaft in a grinding operation. Plate 58 supports a slide member 60 in a V-type track 62, FIG. 4, on its lower surface, and this slide member has an integral adapter plate 64 to which a small electric motor 66 is secured. The output shaft of the motor projects through an elongated slot 68 in motor support plate 58 and supports a grinding stone 72 a short distance above the top of such plate. Slide member 60 is adjustable longitudinally of the motor support plate by a threaded rod 74, FIGS. 4 and 6, supported for free rotation in a depending flange 76 integral with the motor support plate 58. This rod is threadedly engaged in a depending flange 80 integral with the slide member 60. The rearward end of threaded rod 74 terminates in a hand knob 82 which by selected rotation will drive the slide member 60 and the motor 66 to a selected position, to be described. Lock nut means 84 are mounted on threaded rod 74 adjacent flange 76 for locking the grinding stone in a selected position.

In operation, the sharpener of the invention when used with a saw blade having two apertures in its retainers, FIGS. 1, 2 and 4, is mounted on a saw blade by positioning the forward portion of the base 20 against a surface of the blade with the rearward portion thereof projecting out from the edge of the blade and with the projections 24 received in the apertures 16 of the saw blade retainers. The clamp 30 is then closed to securely attach the sharpener to the blades. If necessary, clamp extensions 34 are first adjusted so that each abutment shoe has a firm seated engagement on the blade. Since the shoes 36 are of rubber or other semi-resilient material, they provide a positive non-movable, friction clamping grip of the saw blade between them and the flat forward portion of the base 20. Sharpening of the teeth of the saw is accomplished by pivoting the motor support plate 58 and motor on the pivot support 44, as noted by arrow 88 in FIG. 3, for grinding the inwardly facing surface of the teeth.

Adjustment of the grinding stone 72 for proper engagement with the tooth is by suitable adjustment of the hand knob 82. This adjustment is for initial grinding setup and for tooth and grinder wear. Adjustment of the slide member 40 by hand knob 54 is to move the pivot point 44 relative to the tooth as anchored on the base 20. This movement of the pivot point 44 changes the angle of grind on the surface 18 of the teeth and thus different tooth surface angles can be ground, for example, 40 degrees, 45 degrees, etc. These two adjustments are shown by the arrows 90 in FIG. 3. After the settings have been made for one tooth, subsequent teeth to be ground in this same blade will have a similar and accurate grind. This is the result of the positive positioning of the grinder on the saw blade. The vice grip-type clamp 30 and the pin locaters 24 provide a convenient and fast on and off of the sharpener with a saw blade.

FIG. 5 shows the device of the invention as applied to grinding teeth having retainers with a single aperture. Such embodiment also employs a pair of the locater pins 24 on the base 20' but one of these pins is offset from the retainer 14 in a position to abut against the gullet portion of the retainer. The other pin engages the single aperture and here again there is double pin contact of the retainer by stabilizing means of the sharpener. Location of the pins 24 on the tool is at selected places depending on the position of the aperture 16 in the blade and shape of the gullet of the retainer, it being necessary that such pin be positioned for firm abutment against the retainer.

It is to be understood that the form of our invention herein shown and described is to be taken as a preferred example of the same and that various changes in the shape, size and arrangement of parts may be resorted to without departing from the spirit of our invention, or the scope of the subjoined claims.

Having thus described our invention, we claim:

1. A sharpener for circular saw blades of the type having teeth recessed in openings in the periphery of the saw blade, said teeth having a gullet portion and having at least one aperture used for tool insertion and removal of the teeth in the openings, said sharpener comprising:
   a base member having a clamping surface portion,
   at least one projection on said base member adjacent said clamping surface portion having insert engagement in at least one of the apertures in a saw tooth,
   pivotal grinding wheel support means supported on said base member,
   and clamp means on said base member releasably clamping said sharpener to opposite surfaces of a saw blade by clamping engagement of the saw blade between said clamping surface portion of said base member and said clamp means.

2. The sharpener of claim 1 wherein said clamp means engages the saw blade at spaced points for establishing a positive stationary positioning of the blade on said base member.

3. The sharpener of claim 2 wherein said clamp means comprises a pair of spaced friction abutment shoes that engage the saw blade at spaced points.

4. The sharpener of claim 2 wherein said clamp means comprises a pair of spaced friction abutment shoes that engage the saw blade at spaced points, said abutment shoes being adjustable to vary the clamping space between them and said clamping surface portion.

5. The sharpener of claim 1 including a pair of said projections having insert engagement in a pair of apertures in the saw tooth.

6. The sharpener of claim 1 including a pair of said projections having engagement respectively with an aperture in the saw tooth and a gullet portion of the tooth.

7. A sharpener for circular saw blades of the type having teeth recessed in openings in the periphery of the saw blade, said teeth having a gullet portion and having at least one aperture used for tool insertion and removal of the teeth in the openings, said sharpener comprising:

a base member having a clamping surface portion, at least one projection on said base member adjacent said clamping surface portion having insert engagement in at least one of the apertures in a saw tooth, arm means extending from said base member at an angle to said base member, attaching means attaching said arm means to s id base member for pivotal movement of said arm means relative to said base member, powered grinding means mounted on said arm means and movable pivotally with said arm means in a grinding operation, and releasable clamp means on said base member releasably clamping said sharpener to a saw blade by engaging the blade between said clamping surface portion and said clamping means.

8. The sharpener of claim 7 wherein said clamp means engages the saw blade at spaced points for establishing a positive stationary positioning of the blade on said base member.

9. The sharpener of claim 8 wherein said clamp means comprises a pair of spaced friction abutment shoes that engage the saw blade at spaced points.

10. The sharpener of claim 8 wherein said clamp means comprises a pair of spaced friction abutment shoes that engage the saw blade at spaced points, said abutment shoes being adjustable to vary the clamping space between them and said clamping surface portion.

11. The sharpener of claim 7 wherein said attaching means is adjustable on said base member to adjust the pivot point of said arm means relative to said projection whereby to change the pivot angle of said grinding means on a tooth in the saw blade.

12. The sharpener of claim 7 wherein said base member and said arm means have flat facing surfaces providing a stabilized pivotal support engagement between said base member and said arm means.

13. The sharpener of claim 7 including adjustment support means between said arm means and said grinding means to adjust said grinding means relative to said attaching means.

14. The sharpener of claim 7 including a pair of said projections having insert engagement in a pair of apertures in the saw tooth.

15. The sharpener of claim 7 including a pair of said projections having engagement respectively with an aperture in the saw tooth and a gullet portion of the tooth.

* * * * *